Patented Dec. 27, 1949

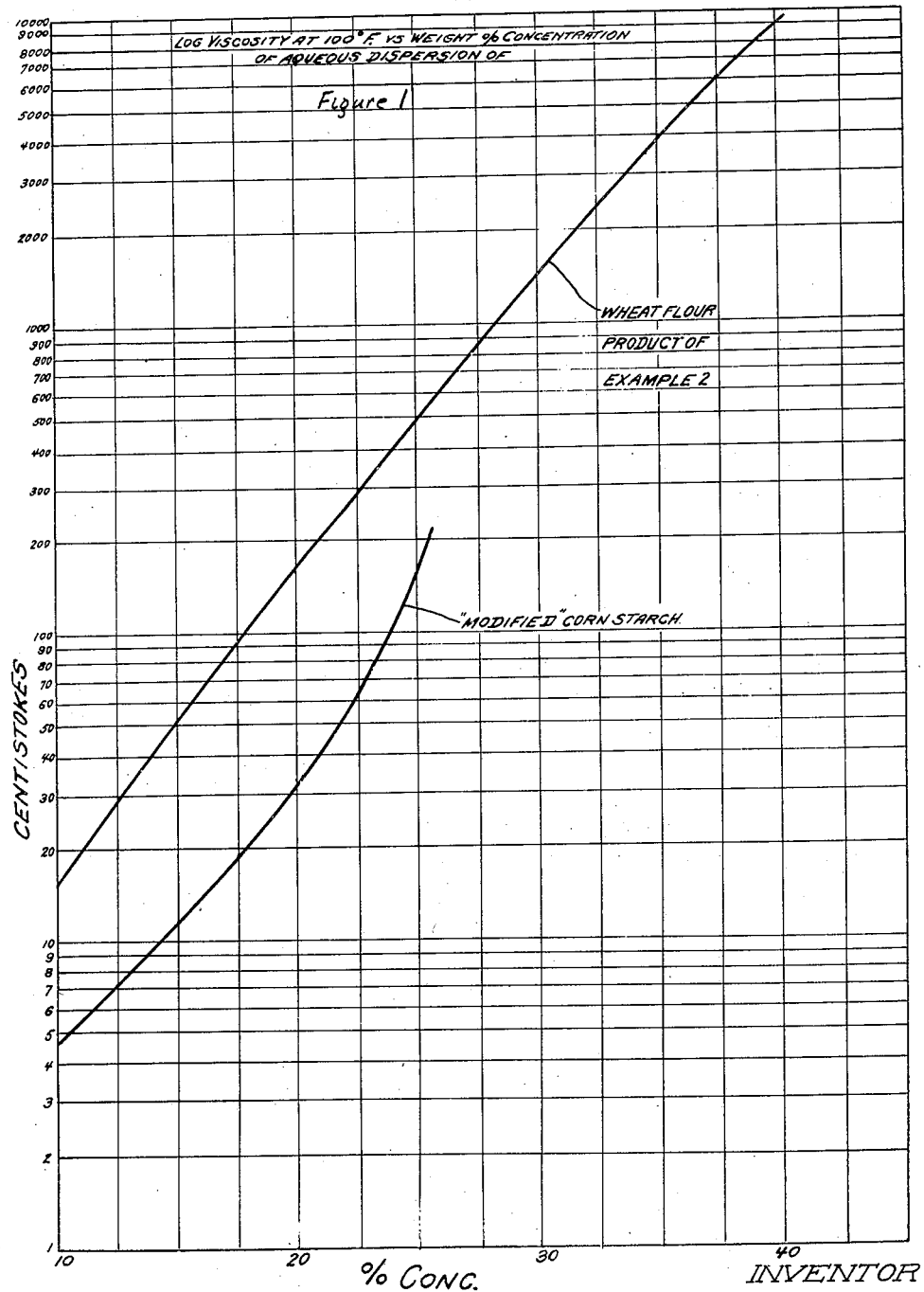

2,492,552

UNITED STATES PATENT OFFICE 2,492,552

ACID TREATED STARCH AND FLOUR PRODUCT

George V. Caesar, Staten Island, N. Y., assignor to Stein, Hall & Company, Inc., New York, N. Y., a corporation of New York Application March 16, 1946, Serial No. 654,991

6 Claims. (Cl. 106—150)

This invention relates to the treatment of proteinaceous starch flours with concentrated acetic acid, and more particularly to converting such flours to water dispersible products whose cooked water dispersions are substantially homogeneous and highly suitable as film-forming adhesives, sizings, and the like.

The conversion of purified starch to film-forming adhesives such as dextrine or similar thin body products is well known. Aqueous suspensions of such products form adhesive, free flowing colloidal dispersions when cooked, and the latter are adapted for many well known industrial uses. Generally they suffer the drawback of having a relatively low viscous stability, that is, upon cooling or aging, or cooling and aging their aqueous dispersions or "solutions" suffer marked decreases in fluidity rendering them more or less unsuitable for commercial usages.

The demand for adhesives, sizings, and the like is great, and the supply of purified starches which are suitable for conversion or modification by the usual methods is limited. Accordingly, there has arisen a very great demand for other readily available film-forming adhesive material.

There is available an abundant supply of low grade dry milled flours which are unsuitable for bakery purposes. In fact, a suitable commercial outlet for such flours is still being sought. When processed by heretofore proposed starch modification or conversion methods, such flours do not yield suitable adhesive film-forming products. The aqueous dispersions of such conversion products tend to be mushy and non-homogeneous and are not suitable for use as substitutes for the dextrine type adhesives. The protein present has been regarded as a cause of these highly objectionable features. The usual processing methods, when applied to such low grade flours for the removal of the relatively high proteinaceous content and recovery of purified starch, are uneconomical.

It has now been found, and very surprisingly indeed, that such low grade, abundant, and relatively inexpensive, dry milled, proteinaceous flours, when treated by glacial acetic acid at or near its boiling point, yield products which are smoothly dispersible in water by cooking aqueous suspensions thereof. The colloidal dispersions obtained therefrom are homogeneous, free flowing, and admirably adapted to replace, and even improve upon, the usual dextrine type film-forming adhesive materials. It is possible that the protein content, which heretofore has been considered a drawback for prior art products, may tend to improve the film-forming and adhesive characteristics of the final products of the invention. The acetic acid may dissolve out some of the protein, but it is economical to retain as much as possible of the protein in water dispersible form.

The objects of, and achieved by, the invention include the provision of a process for the conversion of low grade, dry milled, proteinaceous flour to water dispersible products which give homogeneous, film-forming, adhesive aqueous dispersions; the provision of a commercial outlet for low grade, abundant, cereal flours; and other objects which will become apparent as the invention is more fully developed herein.

The treatment of the proteinaceous flour with glacial acetic acid is preferably conducted at atmospheric pressures and with a ratio of the acid to the flour such that the reaction mass will be conveniently fluid. Other conditions and ratios may be used, however. After completion of liquid reactions, the bulk of the excess acid may be removed from the flour product by filtering or other known means. The filter cake may be vacuum dried to remove still more of the acid, and, if desired, any traces of unbound acid present therein may be neutralized by a base such as ammonia gas. The fixed acetic acid content of the final product will be in the range of about 1 to about 8 weight per cent.

In order further to develop the invention and illustrate some of its advantages, the following examples are included. However, these are not in any sense whatsoever to be construed as limitations upon invention as otherwise described herein.

Example 1

500 grams of 1st clear wheat flour were suspended in one liter of glacial acetic acid, and heated with agitation at 104° C. for 3 hours. The reaction mass was then filtered. The filter cake contained about 75% solids. It was broken up and vacuum dried. It analyzed 3.42 weight per cent of fixed acetic acid. A portion of this product, a substantially water-free solid, was suspended in water and cooked according to the usual procedures. It gave a clear, homogeneous, adhesive, film-forming dispersion.

Example 2

Following the procedure in Example 1, 500 grams of 1st clear wheat flour was treated at 110° C. for 5 hours. The dried product analyzed 6.93 weight per cent of fixed acetic acid. It readily formed a water dispersion, by the usual procedures. This dispersion was thinner bodied than that of Example 1. An aqueous dispersion of this product containing 40% solids showed great stability upon aging. It did not settle out or become lumpy on standing at room temperature for 30 days.

Although it is not intended that the invention shall be limited thereby, the following theoretical explanation is offered as an aid to the more clear understanding of the invention. In the usual conversion of starches to the acetate, inorganic acid catalysts are used with the acetic acid, and acetic anhydride is used. The acetate products obtained thereby may be represented by the formula

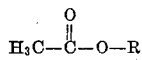

where R is a polysaccharide residue. It is believed, however, that the final starch conversion products present in the products obtained in accordance with the invention are more nearly represented by the following formula:

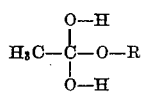

where R is as above defined.

We prefer to call the new starch acetic acid combinations or products pseudo acetates in order to distinguish them from the usual or true acetates.

Distinctions in chemical properties between a true acetate ester and the pseudo acetate product are observable experimentally. A standard method of analysis for "fixed" acetic acid in polysaccharide esters is to titrate a pyridine solution of a true acetate ester with caustic soda. If the true ester products are not first dispersed in pyridine, but instead are titrated with caustic soda alone, after digestion at 55-60° C., the fixed acetic acid values obtained are low. In the case of the "pseudo acetate" products, however, the caustic method yields a fixed acetic acid value checking within 5% or less of the value obtained by the standard pyridine-caustic method. Free or mechanically entangled acid is always present in the dried product in variable proportions. The fixed or bound acid is determined as the difference between the overall titration with caustic soda, after digestion at 55-60° C., and the titration of an aqueous slurry at room temperatures. The precision of fixed acid estimation is good for products which are substantially insoluble in water at room temperatures. For cold water soluble products, produced by prolonged digestion in acetic acid obviously no such precise distinction between fixed and free acid can be determined.

In physical properties, also, the new products obtained in accordance with the invention differ from the usual modified starch type products. A graph of the logarithm of the viscosity plotted against the concentration for aqueous dispersion of a representative sample of each type product, as shown in Figure 1, clearly illustrates this difference. It is to be noted that the modified starch curve is concave upward, whereas the wheat flour pseudo-acetate curve is concave downward. That is, the relative increase in viscosity as the solids content is increased tends to go down in the case of the new product, whereas it tends to become greater in the case of the old acetic plus mineral acid modified starch product.

Obviously, the new products are better adapted for use in higher solids concentration.

Flours which may be used in accordance with the invention include the 1st and 2nd clear wheat flours, rye flours, and any other abundant proteinaceous starch flour.

In view of the foregoing disclosure, variations and modifications thereof will be apparent to one skilled in the art. The invention includes all such modifications and variations as come within the scope of the appended claims.

I claim:

1. A process of converting dry-milled proteinaceous starch flour into a substantially water-free product which product is water-dispersible and capable of yielding homogeneous aqueous dispersions, which process comprises forming a mixture of said flour with a liquid consisting of glacial acetic acid and heating this mixture at a temperature in the range of 100° to 118° C. until the fixed acetic acid content of the flour as determined by titration with aqueous caustic soda of a pyridine dispersion of the treated flour is in the range of 1 to 8 weight per cent, whereby there is formed a substantially water-free product.

2. A process of converting dry-milled wheat flour into a substantially water-free product which product is water-dispersible and capable of yielding homogeneous aqueous dispersions, which process comprises forming a mixture of said flour with a liquid consisting of glacial acetic acid and heating this mixture at a temperature in the range of 100° to 118° C. until the fixed acetic acid content of the flour as determined by titration with aqueous caustic soda of a pyridine dispersion of the treated flour is in the range of 1 to 8 weight per cent, and separating unbound acid therefrom, whereby there is formed a substantially water-free solid product.

3. A process of converting dry-milled rye flour into a substantially water-free product which product is water-dispersible and capable of yielding homogeneous aqueous dispersions, which process comprises forming a mixture of said flour with a liquid consisting of glacial acetic acid and heating this mixture at a temperature in the range of 100° to 118° C. until the fixed acetic acid content of the flour as determined by titration with aqueous caustic soda of a pyridine dispersion of the treated flour is in the range of 1 to 8 weight per cent, and separating unbound acid therefrom, whereby there is formed a substantially water-free solid product.

4. A substantially water-free, but water dispersible proteinaceous starch flour acetic acid combination product having a fixed acetic acid content in the range of from 1 to 8 weight per cent as determined by titration with aqueous caustic soda of a pyridine dispersion thereof, which product is adapted to form upon cooking aqueous suspensions thereof homogeneous dispersions having downwardly concave log viscosity vs. concentration characteristics at a concentration of about 20 weight per cent solids, obtained by forming a mixture of dry-milled, proteinaceous starch flour with a liquid consisting of glacial acetic acid and heating this mixture at a temperature in the range of 100° to 118° C.

5. A substantially water-free, but water dispersible wheat flour acetic acid combination product having a fixed acetic acid content in the range of from 1 to 8 weight per cent as determined by titration with aqueous caustic soda of a pyridine dispersion thereof, which product is adapted to form upon cooking aqueous suspensions thereof homogeneous dispersions having downwardly concave log viscosity vs. concentration characteristics at a concentration of about 20 weight per cent solids, obtained by forming a mixture of dry-milled, wheat flour with a liquid consisting of glacial acetic acid and heating this mixture at a temperature in the range of 110° to 118° C.

6. A substantially water-free, but water dispersible rye flour acetic acid combination product having a fixed acetic acid content in the range of from 1 to 8 weight per cent as determined by titration with aqueous caustic soda of a pyridine dispersion thereof, which product is adapted to form upon cooking aqueous suspensions thereof homogeneous dispersions having downwardly concave log viscosity vs. concentration characteristics at a concentration of about 20 weight per cent solids, obtained by forming a mixture of dry-milled, rye flour with a liquid consisting of glacial acetic acid and heating this mixture at a temperature in the range of 110° to 118° C.

GEORGE V. CAESAR.

REFERENCES CITED

The following references are of record in the file of this patent:

UNITED STATES PATENTS

| Number | Name | Date |
|---|---|---|
| 71,174 | Hover | Nov. 19, 1867 |
| 168,435 | Wattles | Oct. 5, 1875 |
| 278,681 | Campbell | June 5, 1883 |
| 941,159 | Militz | Nov. 23, 1909 |
| 2,362,282 | Lindsay | Nov. 7, 1944 |
| 2,365,173 | Caesar | Dec. 19, 1944 |